(12) United States Patent
Schurzky et al.

(10) Patent No.: US 7,799,877 B2
(45) Date of Patent: Sep. 21, 2010

(54) POLYMERIZATION MONITORING AND CONTROL USING LEADING INDICATORS

(75) Inventors: Kenneth G. Schurzky, Bridgewater, NJ (US); Robert L. Santana, Baytown, TX (US); Fred D. Ehrman, Houston, TX (US); Pradeep P. Shirodkar, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 1096 days.

(21) Appl. No.: 10/492,610

(22) PCT Filed: Oct. 15, 2002

(86) PCT No.: PCT/US02/32765

§ 371 (c)(1),
(2), (4) Date: Apr. 15, 2004

(87) PCT Pub. No.: WO03/044061

PCT Pub. Date: May 30, 2003

(65) Prior Publication Data

US 2004/0254308 A1 Dec. 16, 2004

Related U.S. Application Data

(60) Provisional application No. 60/334,634, filed on Nov. 15, 2001.

(51) Int. Cl.
| | |
|---|---|
| C08F 2/00 | (2006.01) |
| C08F 4/06 | (2006.01) |
| C08F 4/44 | (2006.01) |
| C08F 10/14 | (2006.01) |
| C08F 10/04 | (2006.01) |

(52) U.S. Cl. .......................... 526/68; 526/70; 526/113; 526/160; 526/348.2; 526/348.5; 526/348.6

(58) Field of Classification Search ............ 526/68, 526/70, 113, 160, 348.2, 348.5, 348.6
See application file for complete search history.

(56) References Cited

U.S. PATENT DOCUMENTS

| | | | |
|---|---|---|---|
| 4,243,619 A | 1/1981 | Fraser et al. | 264/40.6 |
| 4,543,399 A | 9/1985 | Jenkins, III et al. | 526/70 |
| 4,588,790 A | 5/1986 | Jenkins, III et al. | 526/70 |
| 5,352,749 A | 10/1994 | DeChellis et al. | 526/68 |
| 5,405,922 A | 4/1995 | DeChellis et al. | 526/68 |

(Continued)

FOREIGN PATENT DOCUMENTS

WO    WO 00/50466    8/2000

(Continued)

*Primary Examiner*—William K Cheung
(74) *Attorney, Agent, or Firm*—Kevin M. Faulkner; Leandro Arechederra, III

(57) ABSTRACT

Methods of monitoring and controlling polymerization reactions are disclosed. The ratio of concentrations of two reactor components are determined in a gas stream of a reactor to obtain a leading indicator function L. The value of L or a function of L, such as a rescaled value or a reciprocal, is compared to a target value, and at least one reactor parameter is adjusted in response to a deviation between L or the function of L and the target value. Monitoring of the leading indicator permits rapid diagnosis of reactor problems, and rapid adjustments of reactor parameters, compared to laboratory analysis of samples of polymer properties.

66 Claims, 4 Drawing Sheets

U.S. PATENT DOCUMENTS

| | | | |
|---|---|---|---|
| 5,436,304 A | 7/1995 | Griffin et al. | 526/68 |
| 5,462,999 A | 10/1995 | Griffin et al. | 526/68 |
| 5,525,678 A | 6/1996 | Mink et al. | 525/246 |
| 6,144,897 A | 11/2000 | Selliers | 700/269 |
| 6,207,606 B1 * | 3/2001 | Lue et al. | 502/113 |
| 6,218,484 B1 | 4/2001 | Brown et al. | 526/68 |

FOREIGN PATENT DOCUMENTS

| | | |
|---|---|---|
| WO | WO01/49751 | 7/2001 |

* cited by examiner

Fig. 3 LEADING INDICATORS vs. FLOW INDEX

POLYMERIZATION MONITORING AND CONTROL USING LEADING INDICATORS

This application claims the benefit of U.S. Provisional Application No. 60/334,634 filed Nov. 15, 2001, the entire disclosure of which is hereby incorporated by reference.

1. FIELD OF THE INVENTION

The present invention relates generally to methods of monitoring and controlling polymerization reactions. More specifically, the invention provides methods of rapidly monitoring polymerization reactions without the need to sample and test product properties, and methods of controlling polymerization reactor parameters in response to deviations between target and monitored functions. The methods are especially useful in polymerization reactions using at least two different catalysts in a single reactor.

2. BACKGROUND

Gas phase processes for the homopolymerization and copolymerization of monomers, especially olefin monomers, are well known in the art. Such processes can be conducted, for example, by introducing the gaseous monomer or monomers into a stirred and/or fluidized bed of resin particles and catalyst.

In the fluidized-bed polymerization of olefins, the polymerization is conducted in a fluidized-bed reactor, wherein a bed of polymer particles is maintained in a fluidized state by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "fluidized-bed" also includes stirred-bed processes and reactors.

The start-up of a fluidized bed reactor generally uses a bed of pre-formed polymer particles. During the course of polymerization, fresh polymer is generated by the catalytic polymerization of the monomer, and polymer product is withdrawn to maintain the bed at constant volume. An industrially favored process employs a fluidization grid to distribute the fluidizing gas to the bed, and also to act as a support for the bed when the supply of gas is cut off. The polymer produced is generally withdrawn from the reactor via one or more discharge conduits disposed in the lower portion of the reactor, near the fluidization grid. The fluidized bed includes a bed of growing polymer particles, polymer product particles and catalyst particles. This reaction mixture is maintained in a fluidized condition by the continuous upward flow from the base of the reactor of a fluidizing gas which includes recycle gas drawn from the top of the reactor, together with added make-up monomer. The fluidizing gas enters the bottom of the reactor and is passed, preferably through a fluidization grid, upwardly through the fluidized bed.

A variety of gas phase polymerization processes are known. For example, the recycle stream can be cooled to a temperature below the dew point, resulting in condensing a portion of the recycle stream, as described in U.S. Pat. Nos. 4,543,399 and 4,588,790. This intentional introduction of a liquid into a recycle stream or reactor during the process is referred to generally as a "condensed mode" operation.

Further details of fluidized bed reactors and their operation are disclosed in, for example, U.S. Pat. Nos. 4,243,619, 4,543,399, 5,352,749, 5,436,304, 5,405,922, 5,462,999, and 6,218,484, the disclosures of which are incorporated herein by reference.

The catalyst used is not particularly limited, and can include, for example, one or more Ziegler-Natta catalysts and/or metallocene catalysts. Mixtures of catalysts can also be used. In particular, polymerization can be carried out with two or more different catalysts present and actively polymerizing at the same time, in a single reactor. The two or more catalysts can be of different catalyst types, such as a non-metallocene catalyst and a metallocene catalyst, to produce a product resin having desirable properties. The catalysts can be fed to the reactor separately or as a physical mixture, or each catalyst particle can contain more than one catalyst compound. When the catalysts include two catalysts producing polymers of different molecular weight and/or different comonomer content, the polymer product can have a bimodal distribution of molecular weight, comonomer, or both. Such bimodal products can have physical properties that are different from those that can be obtained from either catalyst alone, or from post-reactor mixing of the individual unimodal resins obtained from each catalyst alone.

For example, U.S. Pat. No. 5,525,678 discloses a catalyst including a zirconium metallocene that produces a relatively low molecular weight, high comonomer-content polymer, and a titanium non-metallocene that produces a relatively high molecular weight, low comonomer-content polymer. Typically, ethylene is the primary monomer, and small amounts of hexene or other alpha-olefins are added to lower the density of the polyethylene. The zirconium catalyst incorporates most of the comonomer and hydrogen, so that, in a typical example, about 85% of the hexene and 92% of the hydrogen are in the low molecular weight polymer. Water is added to control the overall molecular weight by controlling the activity of the zirconium catalyst.

When polymerizing with two or more catalysts, it is desirable to monitor the relative contribution of each catalyst to the polymer product, so that the polymerization conditions can be adjusted to obtain the desired polymer properties. The properties of the polymer produced in the reactor are affected by a variety of operating parameters, such as temperatures, monomer feed rates, catalyst feed rates, co-catalyst feed rates, hydrogen gas concentration, or water feed rate. In order to produce polymer having a desired set of properties, polymer exiting the reactor is sampled and laboratory measurements carried out to characterize the polymer. If it is discovered that one or more polymer properties are outside a desired range, polymerization conditions can be adjusted, and the polymer resampled. This periodic sampling, testing and adjusting, however, is undesirably slow, since sampling and laboratory testing of polymer properties is time-consuming. As a result, conventional processes can produce large quantities of "off-specification" polymer before manual testing and control can effectively adjust the polymerization conditions.

Thus, it would be desirable to have faster methods for monitoring or predicting changes in polymer properties, or changes in relative activities of catalysts, in multiple catalyst processes.

Other background references include WO 01/49751 and U.S. Pat. No. 6,144,897.

3. SUMMARY OF THE INVENTION

In one embodiment, the present invention provides a method of polymerizing olefins in a fluidized bed reactor. Concentrations $C_1$ and $C_2$ of two reactor components are determined in the recycle gas stream of the reactor to obtain a leading indicator function L defined by:

$$L = \frac{\frac{C_1}{F_1}}{\frac{C_2}{F_2}},$$

where each concentration $C_1$ and $C_2$ is normalized to the flow rate $F_1$ or $F_2$ of the corresponding reactor component into the reactor. The value of L or a function of L, such as a rescaled value or a reciprocal, is compared to a target value, and at least one reactor parameter is adjusted in response to a deviation between L or the function of L and the target value. Monitoring of the leading indicator permits rapid diagnosis of reactor problems, and rapid adjustments of reactor parameters, compared to laboratory analysis of samples of polymer properties.

In another embodiment, L is monitored as a function of time, and the time behavior of L is monitored and compared to a target function.

In another embodiment, at least two leading indicators are monitored and compared with target values or target functions.

In the embodiments described herein, suitable reactor components include, for example, hydrogen, monomers and comonomers. Suitable reactor parameters include, for example, monomer feed rates, comonomer feed rates, catalyst feed rates, cocatalyst feed rates, hydrogen feed rates, and water feed rates.

In another embodiment the polymerization is catalyzed by a catalyst system including a first catalyst producing a first polymer and a second catalyst producing a second polymer, and the method produces a polymer product having a distribution of molecular weight, composition, or both molecular weight and composition, that is broad or bimodal. The reactor parameter can be chosen to selectively alter the relative activity of the first and second catalysts, providing control over the bimodal distribution.

4. BRIEF DESCRIPTION OF THE DRAWINGS

5. DETAILED DESCRIPTION

The methods of the invention are not limited to a particular reactor type, and can use, for example, fluidized-bed reactors. While the discussion herein uses fluidized-bed reactors as a particular example, it should be understood that the methods are not so limited.

5.1 Fluidized-Bed Reactor

Fluidized-bed reactors are well-known in the art; a particular, non-limiting example of a fluidized bed reactor is described herein, for illustrative purposes only. Those skilled in the art will recognize that numerous modifications and enhancements can be made, as desired, to the fluidized-bed reactor.

Figure 1:
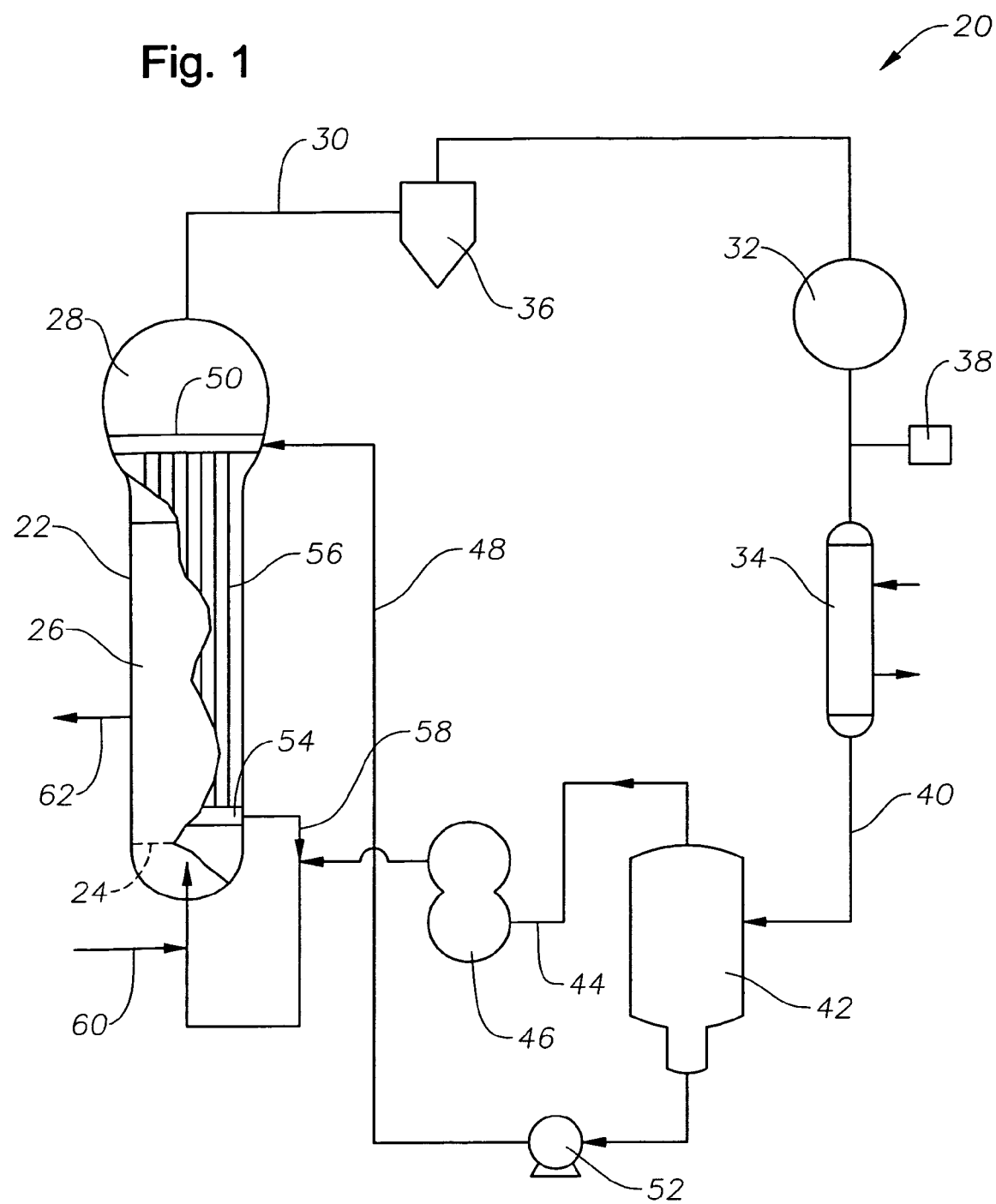
FIG. 1 is a block diagram of a fluidized bed reactor according to an embodiment of the present invention.

FIG. 1 illustrates a gas-phase fluidized bed reactor 20 having a reactor body 22, which is generally an upright cylinder having a fluidization grid 24 located in its lower regions. The reactor body 22 encloses a fluidized bed zone 26 and a velocity reduction zone 28 which is generally of increased diameter compared to the diameter of the fluidized bed zone 26 of the reactor body 22.

The gaseous reaction mixture leaving the top of the reactor body 22, termed the "recycle gas stream," contains principally unreacted monomer, unreacted hydrogen gas, inert condensable gases such as isopentane, and inert non-condensable gases such as nitrogen. The recycle gas stream is transferred via line 30 to compressor 32, and from compressor 32 to heat exchanger 34. An optional cyclone separator 36 may be used as shown, preferably upstream of compressor 32, to remove fines, if desired. A gas analyzer 38 can be used to sample the recycle gas stream to determine concentrations of various components. Typically, the gas analyzer is a gas phase chromatograph (GPC), or a spectrograph such as a near-infrared spectrometer or a Fourier transform near-infrared spectrometer (FT-NIR). An additional heat exchanger (not shown) may also be used if desired, preferably upstream of compressor 32.

The cooled recycle gas stream exits the heat exchanger 34 via line 40. As discussed above, the cooled recycle gas stream can be gaseous, or can be a mixture of gaseous and liquid phases. FIG. 1 shows an optional configuration wherein at least a portion of the recycle gas stream is cooled to a temperature at or below the temperature where liquid condensate begins to form (the dew point). All or a portion of the resultant gas liquid mixture is transferred via line 40 to a separator 42, where all or a portion of the liquid is removed. All or a portion of the gas stream, which may contain some liquid, is transferred via line 44 to a point below the fluidization grid 24 in the lower region of the reactor. An amount of upwardly flowing gas, sufficient to maintain the bed in a fluidized condition, is provided in this way.

Those skilled in the art will understand that less gas is required to maintain fluidization when the reactor employed is a stirred bed reactor.

An optional compressor 46 may be provided to ensure that a sufficient velocity is imparted to the gases flowing through line 44 into the bottom of the reactor. The gas stream entering the bottom of the reactor may contain condensed liquid, if desired.

All or a portion of the liquid phase separated from the recycle stream in separator 42 is transferred via line 48 to a manifold 50 located at or near the top of the reactor. If desired, a pump 52 may be provided in line 48 to facilitate the transfer of liquid to manifold 50. The liquid entering manifold 50 flows downward into manifold 54 through a plurality of conduits 56 which have good heat exchange properties and which are in heat exchange contact with the wall of the reactor. The passage of liquid through the conduits 56 cools the interior wall of the reactor and warms the liquid to a greater or lesser extent, depending upon the temperature differential and the duration and extent of heat exchange contact. Thus by the time the liquid entering manifold 50 reaches manifold 54, it has become a heated fluid which may have remained in an entirely liquid state or it may have become partially or totally vaporized.

As shown in FIG. 1, the heated fluid (gas and/or liquid) is passed from manifold 54 via line 58 to combine with gases leaving the separator 42 via line 44, prior to entry into the reactor in the region below the fluidization grid 24. In like manner, make-up monomer can be introduced into the reactor in either liquid or gaseous form via line 60. Gas and/or liquid collected in manifold 54 may also be transferred directly into the reactor (not shown) in the region below the fluidization grid.

Product polymer particles can be removed from the reactor via line 62 in the conventional way, as for example by the method and apparatus described in U.S. Pat. No. 4,621,952.

Catalyst is continuously or intermittently injected into the reactor using a catalyst feeder (not shown) such as the device disclosed in U.S. Pat. No. 3,779,712. The catalyst is preferably fed into the reactor at a point 20 to 40 percent of the reactor diameter away from the reactor wall and at a height of about 5 to about 30 percent of the height of the bed. Suitable catalysts are described below.

A gas which is inert to the catalyst, such as nitrogen or argon, is preferably used to carry catalyst into the bed. Cold condensed liquid from either separator 42 or from manifold 54 may also be used to transport catalyst into the bed.

Figure 4:
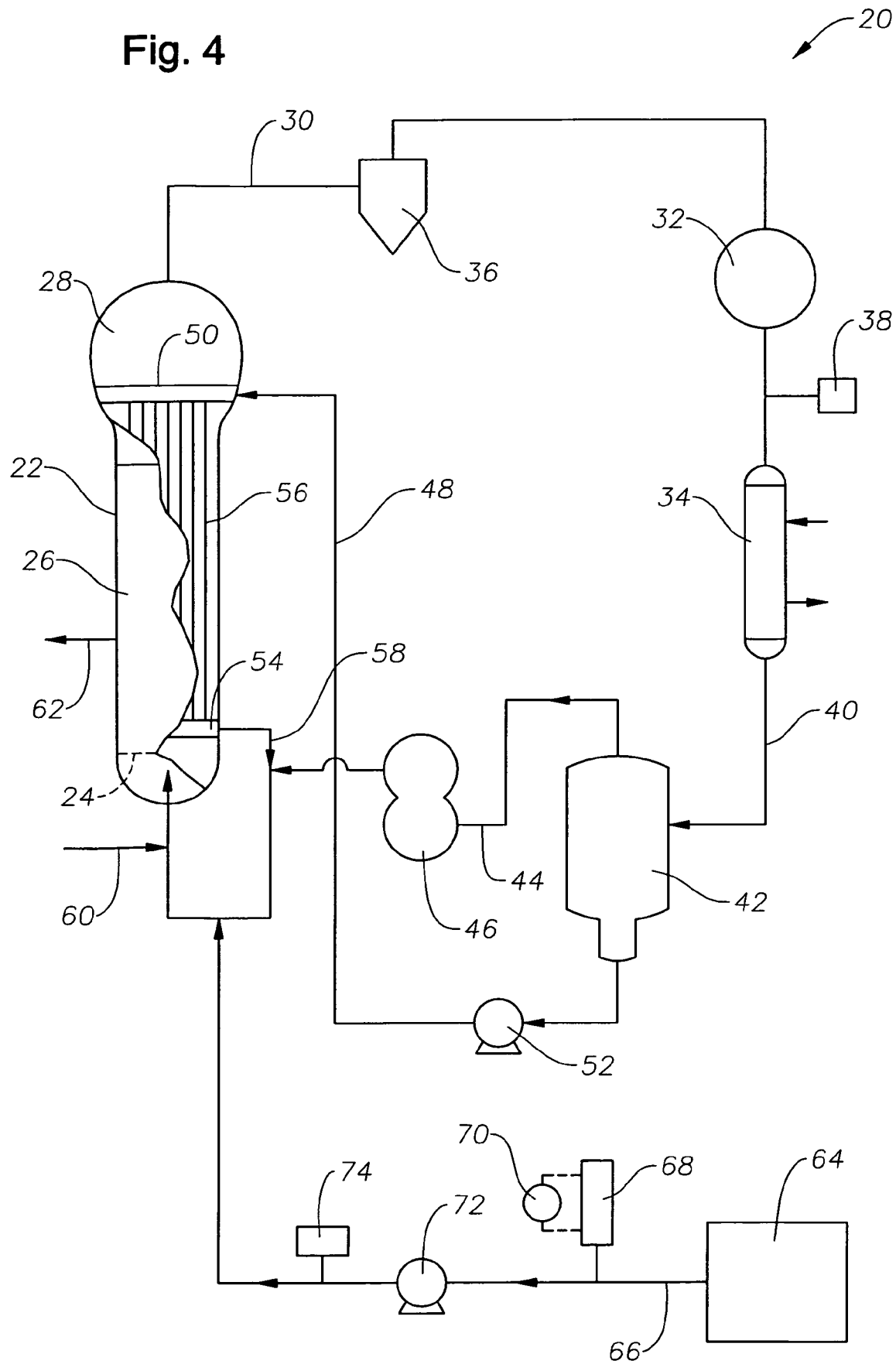
FIG. 4 is a block diagram of a fluidized bed reactor according to an embodiment of the present invention.

Referring to FIG. 4, small quantities of liquid, such as water, can be continuously or intermittently injected into the reactor 20 from a reservoir 64, via a conduit 66. The liquid can be injected anywhere into the reactor 20, such as in the reactor body 22 or recycle stream. In one embodiment, the liquid is injected into the reactor body 22 at a point below the fluidized grid 24. A pump 72 can be provided in conduit 66 to facilitate the transfer of liquid to the reactor. In one embodiment, the pump 72 is a high-precision pump designed for high-pressure liquid chromatography. A level drop 70 in a calibrated cylinder 68 and differential pressure transmitters (not shown) are provided, preferably upstream of the pump, for redundant cross-check of flow rate. If desired, a flow meter 74 located downstream of pump 72 can be provided for optional redundant cross-check of flow rate.

In methods of the present invention, the fluidized bed reactor is operated to form polyolefins having a bimodal molecular weight distribution, a bimodal comonomer distribution, or both. Suitable polyolefins include, but are not limited to, polyethylene, polypropylene, polyisobutylene, and copolymers thereof.

In one embodiment, the at least one polyolefin includes polyethylene copolymers. Low density polyethylene ("LDPE") can be prepared at high pressure using free radical initiators, or in gas phase processes using Ziegler-Natta or vanadium catalysts, and typically has a density in the range of 0.916-0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain long chain branching is also known; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$.

Polymers having more than two types of monomers, such as terpolymers, are also included within the term "copolymer" as used herein. Suitable comonomers include α-olefins, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include polar vinyl, conjugated and non-conjugated dienes, acetylene and aldehyde monomers, which can be included in minor amounts in terpolymer compositions. Non-conjugated dienes useful as comonomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the polyolefin and the specific comonomers selected. One skilled in the art can readily determine the appropriate comonomer content appropriate to produce a polyolefin having a desired density.

5.2 Catalysts

The catalyst includes at least two catalyst components suitable for use in a fluidized bed reactor and capable of polymerizing ethylene, such as one or more metallocene catalysts, one or more Ziegler-Natta catalysts, or mixtures of catalysts. Preferably, the catalyst includes two catalyst components that differ in response to a reactor parameter, such as hydrogen concentration, water concentration, temperature, or comonomer concentration.

Examples of catalysts include Zr/Ti catalysts disclosed in U.S. Pat. No. 4,554,265; mixed chromium catalysts disclosed in U.S. Pat. Nos. 5,155,079 and 5,198,399; Zr/V and Ti/V catalysts disclosed in U.S. Pat. Nos. 5,395,540 and 5,405,817; the hafnium/bulky ligand metallocene mixed catalysts disclosed in U.S. Pat. No. 6,271,323; and the mixed metallocene catalysts disclosed in U.S. Pat. No. 6,207,606.

In a particular embodiment, the catalyst is a metallocene/non-metallocene catalyst such as those disclosed in U.S. Pat. Nos. 5,525,678 and 5,882,750.

5.3 Leading Indicators

As used herein, the term "leading indicator" is used to mean a ratio of two gas phase component concentrations, each concentration in turn expressed as a component's gas phase mole fraction divided by its feed rate into the reactor. Thus, a leading indicator ("L") can be expressed as:

$$L = \frac{\frac{\chi_1}{F_1}}{\frac{\chi_2}{F_2}} \quad (1)$$

where each $\chi_i$ is a gas phase mole fraction and each $F_i$ is a reactor feed rate. The mole fraction $\chi_i$ can be the mole fraction of the i'th component based on the total moles of gas phase components, or based on a subset of the gas phase components. I.e., $$\chi_i = \frac{n_i}{\sum_j n_j} \quad (2)$$

where $n_i$ is the number of moles of the i'th component in the gas phase sample and the sum in the denominator includes all of the gas phase components or a subset of the gas phase components.

In one embodiment, the mole fraction $\chi$ is based on the two components being compared in the leading indicator, so that:

$$\chi_1 = \frac{n_1}{n_1 + n_2}, \chi_2 = \frac{n_2}{n_1 + n_2}, \text{ and } \chi_1 + \chi_2 = 1 \quad (3)$$

Of course, in this embodiment, Equation (1) reduces to:

$$L = \frac{\frac{n_1}{F_1}}{\frac{n_2}{F_2}} \quad (4)$$

The ratios in Equations (1) and (4) can be expressed generally in terms of concentration C, since any volume term in a denominator of C will cancel.

The feed rates in Equation (1) can be in any convenient units, as the units will cancel. Mole fractions are dimensionless, and thus the leading indicator is also dimensionless. It should be appreciated that use of leading indicators as described herein is based on relative, not absolute quantities. One or more leading indicators is monitored as a function of time, and changes in the one or more leading indicator(s) are used as described below to monitor and optionally control the reaction. Thus, functions of Equation (1) or variations thereof are also within the scope of the invention. For example, the reciprocal of a leading indicator is still a leading indicator, and other functions can be applied to the numerator, denominator or the ratio as desired, provided that the function thus obtained permits monitoring of changes over a period of time.

In one embodiment, the leading indicator is based on ratios in which the component selected for the denominator is the major monomer; i.e., the monomer forming more that 50 mole percent of the polymerized units of the polymer. For example, in an ethylene copolymer having more than 50 mole percent polymerized ethylene units, the denominator in Equation (1) includes the ethylene monomer gas phase mole fraction and the ethylene monomer reactor feed rate. Similarly, in a propylene copolymer having more than 50 mole percent polymerized propylene units, the denominator in Equation (1) includes the propylene monomer gas phase mole fraction and the propylene monomer reactor feed rate.

The numerator in Equation (1) can relate to any quantity to which one or both of the catalyst components is sensitive, such as, for example, hydrogen gas concentration or the gas-phase concentration of a comonomer. Of course, the terms "numerator" and "denominator" are used only for convenience, as the reciprocal of a leading indicator is itself a leading indicator.

In one embodiment, the leading indicator is based on the relative amounts of hydrogen gas ($H_2$) and ethylene monomer, the ethylene monomer being denoted "C2" for convenience. In this embodiment, the leading indicator is referred to as the "H2 leading indicator," denoted mathematically as follows:

$$L(H2) = \frac{\frac{\chi_{H2}}{F_{H2}}}{\frac{\chi_{C2}}{F_{C2}}} \quad (5)$$

In another embodiment, the leading indicator is based on the relative amounts of a minor monomer (CM) and the major monomer (M), i.e., $$L = \frac{\frac{\chi_{CM}}{F_{CM}}}{\frac{\chi_M}{F_M}} \quad (6)$$

For example, in a copolymer of ethylene and 1-butene, the leading indicator is based on the relative amounts of 1-butene and ethylene monomers.

In a particular embodiment, the polymer is a copolymer of ethylene and 1-hexene, and the leading indicator is based on the relative amounts of 1-hexene and ethylene monomers. In this embodiment, the leading indicator is referred to as the "C6 leading indicator":

$$L(C6) = \frac{\frac{\chi_{C6}}{F_{C6}}}{\frac{\chi_{C2}}{F_{C2}}} \quad (7)$$

Flow rates of various components can be measured using conventional flow meters. The gas phase concentration of components can be determined by analysis of the recycle gas stream in gas analyzer 38 (FIG. 1).

If desired, one or more leading indicators can be determined as a function of time.

5.4 Reaction Monitoring and Control

In one embodiment, the present invention provides a method of polymerizing olefins in a fluidized bed reactor.

Concentrations $C_1$ and $C_2$ of two reactor components are determined in the recycle gas stream of the reactor to obtain a leading indicator function L where each concentration $C_1$ and $C_2$ is normalized to the flow rate $F_1$ or $F_2$ of the corresponding reactor component into the reactor. The value of L or a function of L, such as a rescaled value or a reciprocal, is compared to a target value, and at least one reactor parameter is adjusted in response to a deviation between L or the function of L and the target value. Monitoring of the leading indicator permits rapid diagnosis of reactor problems, and rapid adjustments of reactor parameters, compared to laboratory analysis of samples of polymer properties.

In another embodiment, L is monitored as a function of time, and the time behavior of L is monitored and compared to a target function. The leading indicator can be determined at a plurality of times. The time interval between determinations of L can be any convenient interval. It is particularly convenient to determine L at regular intervals, such as every minute, every 5 minutes, or other larger or smaller time interval, although the time intervals can also be random. When a large number of L determinations are made, such as determining L at frequent intervals over a period of time, it may be convenient to compute, for example, a rolling average, or to mathematically smooth the L(t) function. Averaging or smoothing is particularly desirable when feed rates vary significantly.

In another embodiment, at least two leading indicators are monitored and compared with target values or target functions. In a particular embodiment, the H2 leading indicator (Equation 5) and a comonomer leading indicator are used, where the comonomer leading indicator is as shown in Equation (6).

In the embodiments described herein, suitable reactor components include, for example, hydrogen, monomers and comonomers.

Suitable reactor parameters include, for example, monomer feed rates, comonomer feed rates, catalyst feed rates, cocatalyst feed rates, hydrogen feed rate, monomer concentration, comonomer concentration, hydrogen concentration, carbon dioxide feed rate, water feed rate, and reactor temperature.

In a particular embodiment, the catalyst used in the polymerization reaction includes a first catalyst producing a first polymer and a second catalyst producing a second polymer, and the method produces a polymer product having a distribution of molecular weight, composition, or both molecular weight and composition, that is broad or bimodal. Preferably, the first and second catalysts have different responses to a reactor parameter that can be adjusted, such as different responses to changes in monomer concentration, comonomer concentration, hydrogen concentration, or water concentration. The reactor parameter can be chosen to selectively alter the relative activity of the first and second catalysts, providing control over the bimodal distribution without the need to alter the catalyst itself.

6. EXAMPLES

The following examples were carried out in a pilot plant scale fluidized bed reactor, using the Zr/Ti metallocene/non-metallocene catalyst of U.S. Pat. Nos. 5,525,678 and 5,882,750. The primary monomer was ethylene, and the comonomer was 1-hexene. Gas phase concentrations of $H_2$, ethylene and 1-hexene were measured using a gas phase chromatograph as the gas analyzer. Flow index, $I_{21.6}$, was measured according to ASTM D-1238, condition F (21.6 kg load, 190° C.). Feed rates of $H_2$, water, ethylene and 1-hexene were measured using conventional flow meters.

A technique based on rheology measurement was developed for measuring bimodal resin composition. Specifically, the technique allows for the determination of the weight fraction and flow index of a high molecular weight (HMW) component of a bimodal resin. A series of HMW and low molecular weight (LMW) components were blended in a range of weight fractions from 0.45 to 0.7 of the HMW component. The resultant "model" blends were characterized rheologically. Storage (or elastic) modulus G' and loss (or viscous) modulus G" were measured according to ASTM D-440-84. Measurements were made at 200° C. using a RMS 800 oscillatory rheometer, available from Rheometric Scientific of Piscataway, N.J. The model blends were used to develop empirical equations, which can be used to determine the composition of components in bimodal resins with unknown compositions produced with similar catalyst components. The following equations can be used to determine the compositions, where Ln is the natural logarithm, $\eta$ is viscosity, and XHMW is the weight fraction of the HMW component:

$$\text{Ln}(XHMW) = -10.0002 - 0.59312 \, \text{Ln}(G'' \text{ at } 0.1 \text{ s}^{-1}) + 1.4729 \, \text{Ln}(G' \text{ at } 100 \text{ s}^{-1}) - 0.3907 \, \text{Ln}(G'' \text{ at } 100 \text{ s}^{-1})$$

$$\text{Ln}(FIHMW) = 9.0223 - 0.01890 \, \text{Ln}((\eta \text{ at } 0.1 \text{ s}^{-1})/100000) - 4.4083 \, \text{Ln}(G' \text{ at } 0.1 \text{ s}^{-1}) + 5.36175 \, \text{Ln}(G'' \text{ at } 0.1 \text{ s}^{-1}) - 0.3840 \, \text{Ln}(G'' \text{ at } 100 \text{ s}^{-1})$$

Flow index (FI), melt index (MI), and melt flow rate (MFR, flow index/melt index) of the blends can also be measured and related back to their composition. The empirical equations can then be used to determine the composition of components in bimodal resins with unknown compositions. The following equations can be used to determine the compositions:

$$\text{Ln}(XHMW) = -0.33759 + 0.516577 \, \text{Ln}(FI) - 0.01523 MFR$$

$$\text{Ln}(FIHMW) = 0.827076 - 0.04911 \, \text{Ln}(FI) - 0.0014 MFR$$

Example 1

The H2 and C6 leading indicators were determined as a function of time, at one minute intervals, over a period of 18 hours. The data are shown in Table 1. For brevity, only every fifth data point is included in the Table. In the Table, L(H2) is the H2 leading indicator as defined in Equation (5), L(C6) is the C6 leading indicator as defined in Equation (7), time is in minutes, and "$H_2O$" indicates ten times the water flow rate into the reactor, in units of parts per million parts of ethylene (ppm), based on parts by weight.

TABLE 1

| Time (min) | L(H2) | L(C6) | $H_2O$ |
|---|---|---|---|
| 0 | 161.93 | 0.2710 | 149.64 |
| 5 | 161.44 | 0.2802 | 150.99 |
| 10 | 161.94 | 0.3110 | 149.89 |
| 15 | 161.51 | 0.3162 | 150.00 |
| 20 | 161.11 | 0.2985 | 149.81 |
| 25 | 161.16 | 0.2870 | 150.10 |
| 30 | 161.76 | 0.2872 | 150.61 |
| 35 | 162.07 | 0.3242 | 150.21 |
| 40 | 159.07 | 0.2813 | 152.35 |
| 45 | 160.96 | 0.2977 | 150.54 |
| 50 | 159.28 | 0.3088 | 150.92 |
| 55 | 159.74 | 0.2992 | 150.93 |

TABLE 1-continued

| Time (min) | L(H2) | L(C6) | H₂O |
|---|---|---|---|
| 60 | 159.74 | 0.2953 | 149.96 |
| 65 | 159.71 | 0.2705 | 150.56 |
| 70 | 157.03 | 0.2891 | 152.07 |
| 75 | 159.46 | 0.2906 | 150.47 |
| 80 | 160.01 | 0.3072 | 150.51 |
| 85 | 160.01 | 0.3243 | 150.28 |
| 90 | 159.64 | 0.3266 | 149.66 |
| 95 | 161.22 | 0.2650 | 150.62 |
| 100 | 162.44 | 0.2963 | 149.64 |
| 105 | 161.59 | 0.2961 | 149.25 |
| 110 | 162.86 | 0.2865 | 148.73 |
| 115 | 166.58 | 0.3589 | 147.78 |
| 120 | 162.21 | 0.3683 | 150.39 |
| 125 | 160.40 | 0.2748 | 150.16 |
| 130 | 166.41 | 0.2893 | 145.75 |
| 135 | 161.80 | 0.2801 | 149.65 |
| 140 | 162.04 | 0.3307 | 148.86 |
| 145 | 162.97 | 0.3154 | 148.29 |
| 150 | 163.03 | 0.3156 | 150.26 |
| 155 | 161.05 | 0.3063 | 151.26 |
| 160 | 161.03 | 0.3188 | 150.07 |
| 165 | 160.89 | 0.3234 | 149.27 |
| 170 | 162.24 | 0.2615 | 149.90 |
| 175 | 162.87 | 0.3241 | 149.40 |
| 180 | 161.48 | 0.3325 | 149.88 |
| 185 | 162.36 | 0.3119 | 149.60 |
| 190 | 159.66 | 0.3284 | 149.40 |
| 195 | 159.85 | 0.3298 | 150.19 |
| 200 | 160.82 | 0.3100 | 149.06 |
| 205 | 160.40 | 0.2929 | 149.88 |
| 210 | 158.75 | 0.2807 | 149.38 |
| 215 | 156.77 | 0.2939 | 150.83 |
| 220 | 158.60 | 0.2793 | 150.68 |
| 225 | 159.87 | 0.2819 | 148.75 |
| 230 | 156.42 | 0.2783 | 150.90 |
| 235 | 157.46 | 0.2904 | 150.42 |
| 240 | 155.86 | 0.2905 | 150.30 |
| 245 | 159.46 | 0.2956 | 149.89 |
| 250 | 154.88 | 0.2910 | 151.44 |
| 255 | 156.16 | 0.2685 | 149.72 |
| 260 | 155.94 | 0.2308 | 150.02 |
| 265 | 156.96 | 0.2815 | 149.24 |
| 270 | 157.42 | 0.2918 | 150.36 |
| 275 | 155.48 | 0.2864 | 150.30 |
| 280 | 155.03 | 0.2852 | 150.07 |
| 285 | 155.10 | 0.2859 | 149.68 |
| 290 | 153.51 | 0.2902 | 151.10 |
| 295 | 154.33 | 0.2866 | 150.29 |
| 300 | 155.75 | 0.2764 | 150.34 |
| 305 | 155.94 | 0.2860 | 149.88 |
| 310 | 154.45 | 0.2852 | 150.58 |
| 315 | 153.46 | 0.2688 | 150.66 |
| 320 | 156.16 | 0.2624 | 150.02 |
| 325 | 156.69 | 0.2665 | 149.91 |
| 330 | 155.94 | 0.2620 | 150.10 |
| 335 | 157.01 | 0.2547 | 150.12 |
| 340 | 157.97 | 0.2610 | 149.37 |
| 345 | 157.57 | 0.2830 | 150.56 |
| 350 | 159.59 | 0.2666 | 150.26 |
| 355 | 158.92 | 0.2660 | 149.81 |
| 360 | 156.48 | 0.2710 | 149.85 |
| 365 | 160.44 | 0.2718 | 150.55 |
| 370 | 160.41 | 0.2719 | 150.82 |
| 375 | 162.01 | 0.2810 | 149.55 |
| 380 | 160.74 | 0.2442 | 150.54 |
| 385 | 161.37 | 0.2942 | 149.76 |
| 390 | 163.68 | 0.3084 | 149.45 |
| 395 | 163.41 | 0.3361 | 108.27 |
| 400 | 163.58 | 0.3484 | 101.01 |
| 405 | 165.75 | 0.3390 | 99.89 |
| 410 | 168.80 | 0.2942 | 99.70 |
| 415 | 168.73 | 0.3008 | 99.76 |
| 420 | 169.52 | 0.3054 | 100.29 |
| 425 | 170.83 | 0.2731 | 100.18 |
| 430 | 170.76 | 0.2721 | 99.49 |
| 435 | 167.82 | 0.3152 | 99.91 |
| 440 | 167.78 | 0.3209 | 100.73 |
| 445 | 169.13 | 0.3135 | 100.04 |
| 450 | 175.93 | 0.3106 | 99.76 |
| 455 | 175.25 | 0.3156 | 100.43 |
| 460 | 177.54 | 0.3173 | 99.94 |
| 465 | 178.08 | 0.3184 | 100.65 |
| 470 | 178.28 | 0.3084 | 100.25 |
| 475 | 180.42 | 0.3071 | 99.64 |
| 480 | 193.59 | 0.2718 | 100.54 |
| 485 | 195.32 | 0.3583 | 100.39 |
| 490 | 196.09 | 0.3433 | 100.58 |
| 495 | 195.58 | 0.3323 | 100.91 |
| 500 | 200.95 | 0.2968 | 100.20 |
| 505 | 207.24 | 0.3112 | 98.86 |
| 510 | 190.08 | 0.3410 | 99.93 |
| 515 | 188.05 | 0.3263 | 100.61 |
| 520 | 188.29 | 0.3251 | 99.55 |
| 525 | 188.50 | 0.3372 | 100.34 |
| 530 | 188.94 | 0.3789 | 99.90 |
| 535 | 188.43 | 0.3810 | 100.16 |
| 540 | 187.61 | 0.3120 | 99.87 |
| 545 | 186.21 | 0.3738 | 99.32 |
| 550 | 182.97 | 0.3802 | 100.27 |
| 555 | 195.12 | 0.3936 | 100.31 |
| 560 | 201.00 | 0.4034 | 98.84 |
| 565 | 200.71 | 0.3862 | 101.97 |
| 570 | 197.80 | 0.4153 | 99.76 |
| 575 | 192.05 | 0.3866 | 99.22 |
| 580 | 192.90 | 0.3839 | 99.63 |
| 585 | 192.45 | 0.3681 | 99.85 |
| 590 | 195.27 | 0.4139 | 98.72 |
| 595 | 188.10 | 0.4061 | 99.79 |
| 600 | 183.34 | 0.4139 | 100.07 |
| 605 | 184.98 | 0.3851 | 99.31 |
| 610 | 182.90 | 0.3725 | 99.40 |
| 615 | 182.35 | 0.3640 | 99.58 |
| 620 | 172.70 | 0.4079 | 99.73 |
| 625 | 171.63 | 0.4071 | 100.13 |
| 630 | 172.89 | 0.3361 | 100.00 |
| 635 | 171.72 | 0.3638 | 99.91 |
| 640 | 169.98 | 0.3658 | 100.25 |
| 645 | 169.15 | 0.3555 | 100.00 |
| 650 | 170.16 | 0.3400 | 100.58 |
| 655 | 171.69 | 0.3361 | 100.15 |
| 660 | 171.34 | 0.3626 | 99.61 |
| 665 | 170.13 | 0.3271 | 101.26 |
| 670 | 171.62 | 0.3213 | 100.36 |
| 675 | 171.65 | 0.3489 | 101.21 |
| 680 | 172.61 | 0.3799 | 100.79 |
| 685 | 181.17 | 0.3837 | 100.45 |
| 690 | 180.15 | 0.3841 | 100.40 |
| 695 | 179.91 | 0.3956 | 101.30 |
| 700 | 181.75 | 0.3982 | 100.44 |
| 705 | 182.50 | 0.3483 | 100.56 |
| 710 | 182.48 | 0.3227 | 100.85 |
| 715 | 183.21 | 0.3242 | 100.13 |
| 720 | 182.96 | 0.3801 | 99.90 |
| 725 | 183.89 | 0.3575 | 99.99 |
| 730 | 187.04 | 0.3531 | 99.78 |
| 735 | 186.26 | 0.3575 | 99.74 |
| 740 | 185.57 | 0.3415 | 100.00 |
| 745 | 185.99 | 0.3497 | 100.51 |
| 750 | 185.68 | 0.4063 | 100.55 |
| 755 | 186.53 | 0.3881 | 99.88 |
| 760 | 186.60 | 0.3723 | 99.54 |
| 765 | 186.88 | 0.3664 | 99.90 |
| 770 | 189.89 | 0.4575 | 98.39 |
| 775 | 187.31 | 0.4372 | 99.86 |
| 780 | 191.20 | 0.4284 | 99.16 |
| 785 | 192.38 | 0.4077 | 99.10 |
| 790 | 190.54 | 0.4015 | 99.83 |
| 795 | 193.08 | 0.4437 | 99.50 |
| 800 | 191.88 | 0.4424 | 100.71 |
| 805 | 192.07 | 0.4395 | 99.55 |
| 810 | 192.56 | 0.4205 | 99.87 |
| 815 | 192.20 | 0.3860 | 99.92 |

TABLE 1-continued

| Time (min) | L(H2) | L(C6) | H₂O |
|---|---|---|---|
| 820 | 191.77 | 0.3845 | 100.13 |
| 825 | 189.95 | 0.4487 | 99.82 |
| 830 | 191.93 | 0.4060 | 99.51 |
| 835 | 190.73 | 0.3934 | 99.05 |
| 840 | 189.66 | 0.3893 | 99.46 |
| 845 | 190.39 | 0.4289 | 99.85 |
| 850 | 190.19 | 0.4361 | 99.57 |
| 855 | 189.75 | 0.4033 | 100.40 |
| 860 | 187.23 | 0.3957 | 99.77 |
| 865 | 187.06 | 0.4240 | 99.54 |
| 870 | 187.25 | 0.4461 | 100.32 |
| 875 | 187.03 | 0.4391 | 100.18 |
| 880 | 184.73 | 0.4342 | 100.28 |
| 885 | 188.19 | 0.3791 | 99.92 |
| 890 | 186.58 | 0.3779 | 99.97 |
| 895 | 182.05 | 0.4171 | 99.82 |
| 900 | 182.22 | 0.4696 | 100.30 |
| 905 | 180.37 | 0.3897 | 100.39 |
| 910 | 182.88 | 0.3785 | 99.46 |
| 915 | 180.56 | 0.4438 | 100.58 |
| 920 | 181.92 | 0.4448 | 99.99 |
| 925 | 181.95 | 0.4406 | 100.22 |
| 930 | 183.03 | 0.3900 | 99.11 |
| 935 | 182.07 | 0.4014 | 99.86 |
| 940 | 181.67 | 0.4025 | 99.98 |
| 945 | 183.44 | 0.4171 | 99.50 |
| 950 | 182.50 | 0.4188 | 100.45 |
| 955 | 181.06 | 0.4325 | 100.46 |
| 960 | 182.97 | 0.4105 | 99.72 |
| 965 | 183.00 | 0.4670 | 99.80 |
| 970 | 183.99 | 0.4683 | 99.33 |
| 975 | 181.87 | 0.4774 | 100.20 |
| 980 | 181.22 | 0.4730 | 99.92 |
| 985 | 182.40 | 0.4054 | 100.09 |
| 990 | 182.60 | 0.4161 | 100.01 |
| 995 | 185.19 | 0.4419 | 99.07 |
| 1000 | 183.48 | 0.4502 | 100.18 |
| 1005 | 180.53 | 0.4333 | 101.49 |
| 1010 | 182.07 | 0.4361 | 100.12 |
| 1015 | 181.87 | 0.3928 | 99.92 |
| 1020 | 183.45 | 0.4457 | 99.54 |
| 1025 | 182.33 | 0.4545 | 99.40 |
| 1030 | 180.89 | 0.4556 | 99.95 |
| 1035 | 184.81 | 0.4433 | 99.37 |
| 1040 | 183.87 | 0.4431 | 99.03 |
| 1045 | 180.45 | 0.4468 | 99.46 |
| 1050 | 180.73 | 0.4916 | 99.28 |
| 1055 | 180.78 | 0.4142 | 100.21 |
| 1060 | 182.01 | 0.4011 | 99.76 |
| 1065 | 180.98 | 0.4215 | 98.99 |
| 1070 | 180.73 | 0.4079 | 100.23 |
| 1075 | 180.47 | 0.4315 | 99.96 |
| 1080 | 180.75 | 0.5005 | 99.95 |

The flow index $I_{21.6}$ was measured at several time points by taking a sample of the polymer product at the corresponding time. The flow index results are shown in Table 2.

TABLE 2

| Time (min) | Flow Index, $I_{21.6}$ (g/10 min) |
|---|---|
| 60 | 27.88 |
| 300 | 23.09 |
| 540 | 14.28 |
| 780 | 7.59 |
| 1020 | 4.04 |

Figure 2:
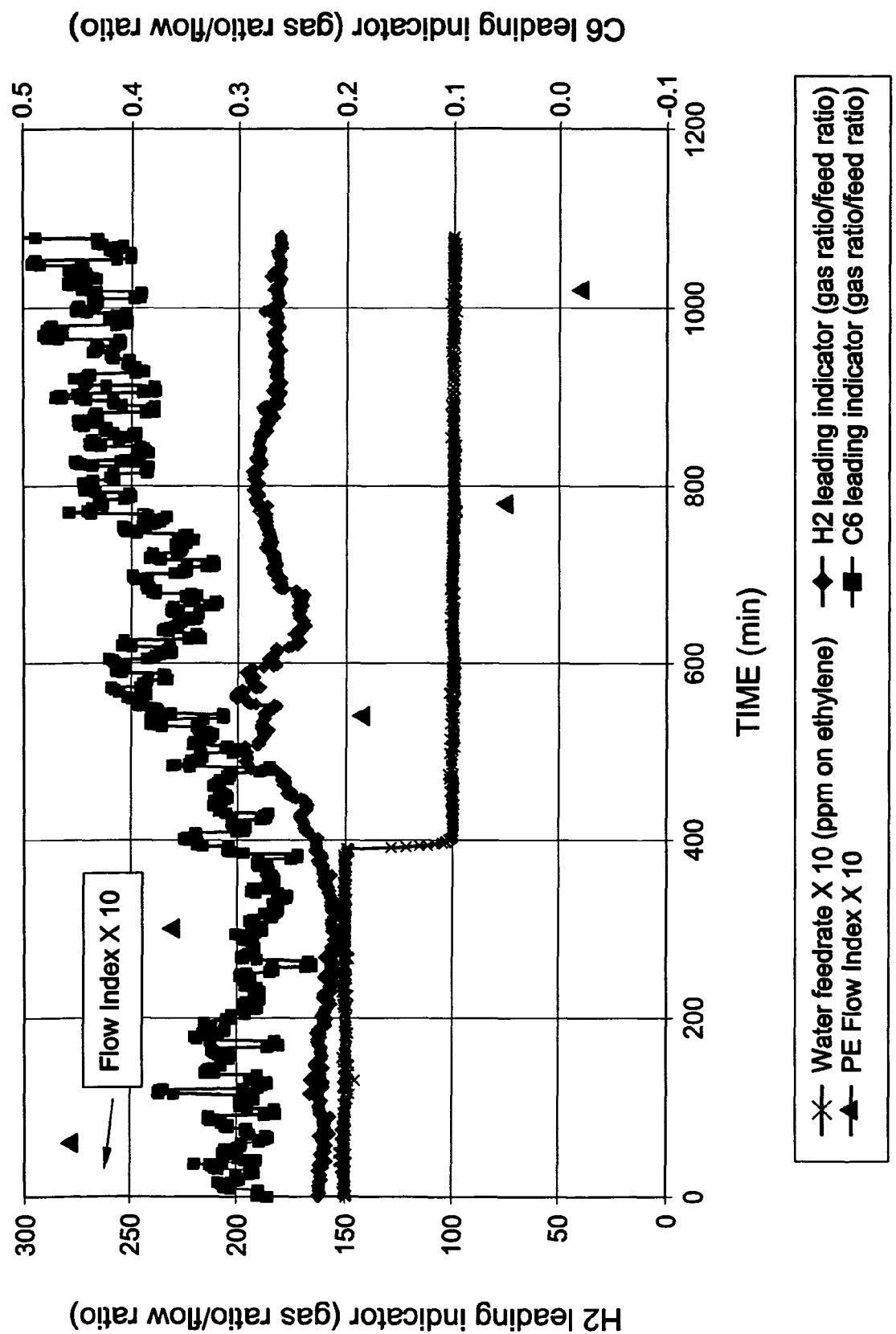
FIG. 2 shows the response of several leading indicators as a function of time to changes in reactor water feed according to Example 1.
Figure 3:
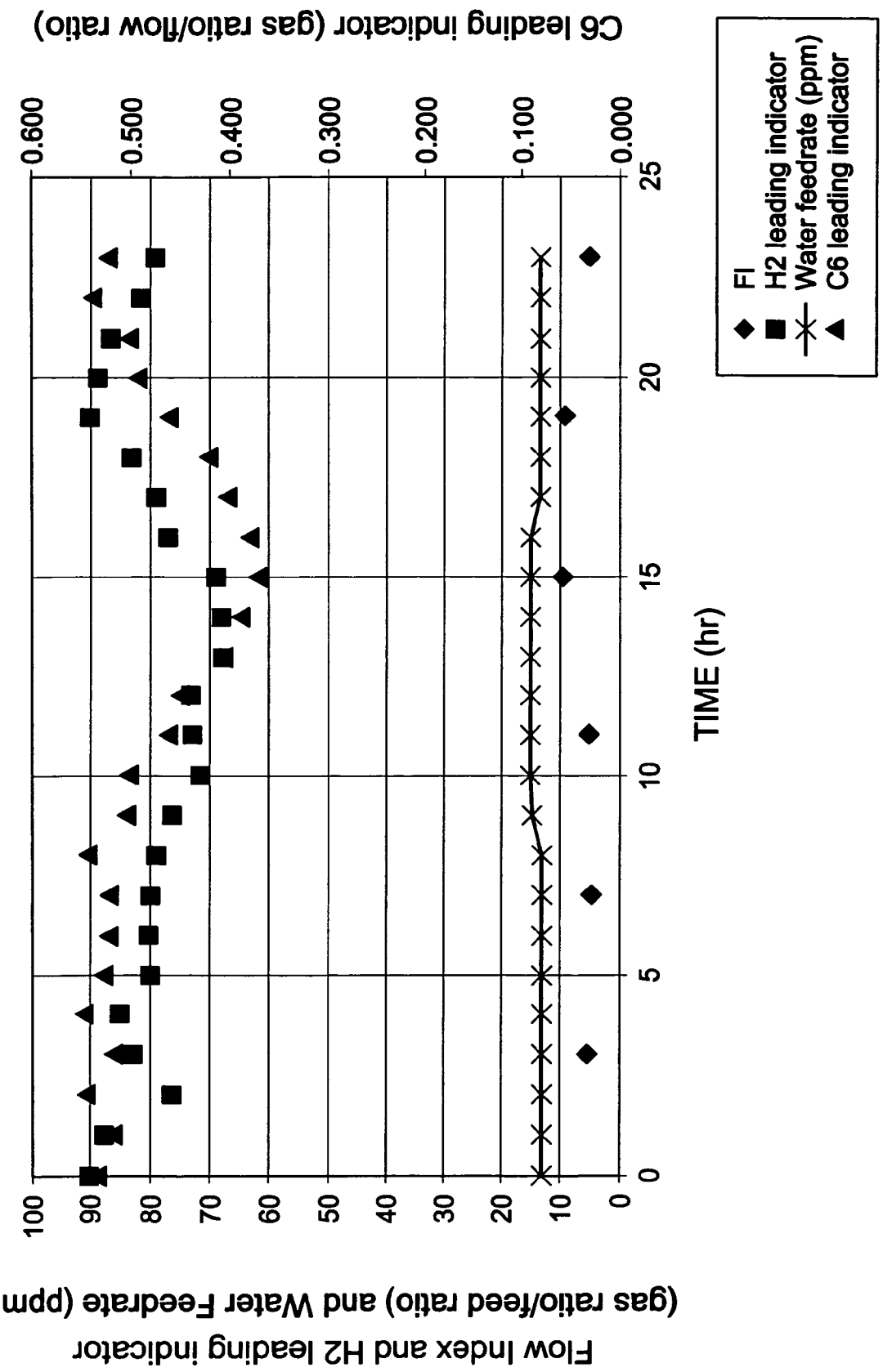
FIG. 3 shows the response of several leading indicators as a function of time to changes in reactor water feed according to Example 2.

The data from Tables 1 and 2 are shown graphically in FIG. 2. Although Table 1 lists only every fifth data point, FIG. 2 shows the complete data set. The flow values are multiplied by 10 for convenient display. As shown in FIG. 2, at approximately 400 minutes, the water flow rate decreased by ⅓, and the C6 and H2 leading indicators both rose, indicating the change in reactor conditions. The change in leading indicators is evident very soon after the change in water feed rate, but the full change in the flow index of the polymer product is not evident until much later. Further, the flow index data points are placed at the time the polymer sample was taken. Determination of the flow index in a laboratory took approximately an additional 2 hours.

Example 2

Example 1 was repeated, except that determinations of leading indicators were made based on hourly averages of the measured process variables. Determination of polymer flow index was made at several time points. The data are shown in Table 3.

TABLE 3

| Time (hr) | L(H2) | L(C6) | H₂O (ppm) | $I_{21.6}$ (g/10 min) |
|---|---|---|---|---|
| 0 | 90.08 | 0.533 | 13.000 | |
| 1 | 87.40 | 0.518 | 13.009 | |
| 2 | 76.37 | 0.544 | 12.986 | |
| 3 | 82.88 | 0.517 | 13.025 | 5.54 |
| 4 | 85.14 | 0.547 | 12.986 | |
| 5 | 79.95 | 0.528 | 13.001 | |
| 6 | 80.31 | 0.522 | 13.006 | |
| 7 | 79.96 | 0.521 | 13.000 | 4.68 |
| 8 | 79.06 | 0.543 | 12.987 | |
| 9 | 76.23 | 0.504 | 14.648 | |
| 10 | 71.61 | 0.503 | 14.993 | |
| 11 | 72.85 | 0.461 | 15.010 | 5.23 |
| 12 | 73.02 | 0.451 | 14.987 | |
| 13 | 67.69 | 0.407 | 15.019 | |
| 14 | 68.06 | 0.388 | 15.001 | |
| 15 | 68.56 | 0.372 | 15.016 | 9.57 |
| 16 | 76.92 | 0.379 | 14.860 | |
| 17 | 79.05 | 0.402 | 13.491 | |
| 18 | 83.03 | 0.422 | 13.504 | |
| 19 | 90.24 | 0.462 | 13.483 | 9.19 |
| 20 | 88.66 | 0.493 | 13.490 | |
| 21 | 86.52 | 0.503 | 13.512 | |
| 22 | 81.34 | 0.538 | 13.493 | |
| 23 | 79.13 | 0.523 | 13.496 | 5.09 |

The data are shown graphically in FIG. 2. Between 8 and 10 hours, water feed rate increased from about 13 to about 15 ppm, then returned to 13 ppm at about 16 hours. For the Zr/Ti catalyst used, increasing water concentration has the effect of increasing the relative activity of the Zr catalyst. As shown in the Figure, the flow index shows a slow, time-delayed response to the change in water concentration, whereas the leading indicators respond rapidly.

Examples 3-9

Examples 3-9 show the use of leading indicator values in reactor startup. H2 and C6 leading indicators were measured as the reactor reached 10° F. (6° C.) bed activity, except that in Examples 5 and 8 the reactor only reached 6° F. (3° C.) and 7° F. (4° C.), respectively. The results are shown in Table 4.

TABLE 4

| Example No. | Water Feed | L(C6) | L(H2) |
|---|---|---|---|
| 3 | Yes | 0.35 | 170 |
| 4 | Yes | 0.39 | 122 |
| 5 | Yes | 0.30 | 156 |

TABLE 4-continued

| Example No. | Water Feed | L(C6) | L(H2) |
|---|---|---|---|
| 6 | Yes | 0.23 | 145 |
| 7 | unknown | 0.60 | 270 |
| 8 | unknown | 0.60 | 220 |
| 9 | No | 0.60 | 240 |

In Examples 3-6, the startup was successful. In Examples 7 and 8, the reactor had quick, massive sheeting and was shut down. In Example 9, startup was unsuccessful. After shut down, a malfunctioning fitting was found to be preventing water from entering the reactor.

Various trade names used herein are indicated by a ™ symbol, indicating that the names may be protected by certain trademark rights. Some such names may also be registered trademarks in various jurisdictions.

All patents, test procedures, and other documents cited herein, including priority documents, are fully incorporated by reference to the extent such disclosure is not inconsistent with this invention and for all jurisdictions in which such incorporation is permitted.

While the present invention has been described and illustrated by reference to particular embodiments, it will be appreciated by those of ordinary skill in the art, that the invention lends itself to many different variations not illustrated herein. For these reasons, then, reference should be made solely to the appended claims for purposes of determining the true scope of the present invention.

What is claimed is:

1. A method of olefin polymerization in a continuous reactor, the method comprising:
   (a) determining feed rates $F_{H2}$ and $F_M$ of hydrogen and a selected monomer or comonomer, respectively, provided to the reactor and gas phase relative concentrations $C_{H2}$ and $C_M$ of the hydrogen and the selected monomer or comonomer, respectively, in a recycle gas stream of the reactor to obtain a leading indicator function L defined by:

$$L = \frac{\frac{C_{H2}}{F_{H2}}}{\frac{C_M}{F_M}};$$

(b) comparing L or $L^{-1}$ to a target value; and
   (c) adjusting at least one reactor parameter in response to a deviation between L or $L^{-1}$ and the target value;
   wherein the olefin polymerization is catalyzed by a catalyst system, the catalyst system comprising a metallocene catalyst and a non-metallocene catalyst; and
   wherein the step of adjusting at least one reactor parameter is effective to alter the relative productivity of the catalysts.

2. The method of claim 1, wherein the reactor is a fluidized bed reactor.

3. The method of claim 1, wherein the method produces copolymers having a majority of polymerized monomer units and a minority of polymerized comonomer units, and the selected monomer or comonomer is the monomer.

4. The method of claim 1, wherein the method produces copolymers having a majority of polymerized monomer units and a minority of polymerized comonomer units, and the selected monomer or comonomer is the comonomer.

5. The method of claim 3, wherein the monomer is ethylene and the comonomer is selected from the group consisting of $C_3$-$C_{12}$ alpha-olefins and mixtures thereof.

6. The method of claim 4, wherein the monomer is ethylene and the comonomer is selected from the group consisting of $C_3$-$C_{12}$ alpha-olefins and mixtures thereof.

7. The method of claim 1, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

8. The method of claim 1, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

9. The method of claim 1, wherein the metallocene and non-metallocene catalysts are supported and are both present on the same support.

10. The method of claim 1, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

11. The method of claim 10, wherein the at least one reactor parameter comprises a water feed rate or a carbon dioxide feed rate.

12. A method of olefin polymerization in a fluidized bed reactor, the method comprising:
   (a) determining feed rates $F_{H2}$ and $F_M$ of hydrogen and a selected monomer or comonomer, respectively, provided to the reactor and gas phase relative concentrations $C_{H2}$ and $C_M$ of the hydrogen and the selected monomer or comonomer, respectively, in a recycle gas stream of the reactor to obtain a leading indicator function L defined by:

$$L = \frac{\frac{C_{H2}}{F_{H2}}}{\frac{C_M}{F_M}};$$

wherein step (a) is repeated a plurality of times to obtain L as a function of time, L(t);
   (b) comparing L(t) or $L^{-1}(t)$ to a target function; and
   (c) adjusting at least one reactor parameter in response to a deviation between L(t) or $L^{-1}(t)$ and the target function;
   wherein the olefin polymerization is catalyzed by a catalyst system, the catalyst system comprising a metallocene catalyst and a non-metallocene catalyst; and
   wherein the step of adjusting at least one reactor parameter is effective to alter the relative productivity of the catalysts.

13. The method of claim 12, wherein the method produces copolymers having a majority of polymerized monomer units and a minority of polymerized comonomer units, and the selected monomer or comonomer is the monomer.

14. The method of claim 12, wherein the method produces copolymers having a majority of polymerized monomer units and a minority of polymerized comonomer units, and the selected monomer or comonomer is the comonomer.

15. The method of claim 13, wherein the monomer is ethylene and the comonomer is selected from the group consisting of $C_3$-$C_{12}$ alpha-olefins and mixtures thereof.

16. The method of claim 14, wherein the monomer is ethylene and the comonomer is selected from the group consisting of $C_3$-$C_{12}$ alpha-olefins and mixtures thereof.

17. The method of claim 12, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

18. The method of claim 12, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

19. The method of claim 12, wherein the metallocene and non-metallocene catalysts are supported and are both present on the same support.

20. The method of claim 12, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

21. The method of claim 20, wherein the at least one reactor parameter comprises a water feed rate or a carbon dioxide feed rate.

22. A method of polymerizing olefin monomers and comonomers in a fluidized bed reactor, the method comprising:
  (a) determining feed rates $F_{H2}$, $F_M$, and $F_{CM}$ of hydrogen, the olefin monomer and the comonomer, respectively, provided to the reactor and gas phase concentrations $C_{H2}$, $C_M$, and $C_{CM}$ of the hydrogen, the olefin monomer and the comonomer, respectively, in a recycle gas stream of the reactor to obtain leading indicator functions $L_1$ and $L_2$ defined by:

$$L_1 = \frac{\frac{C_{H2}}{F_{H2}}}{\frac{C_M}{F_M}} \text{ and } L_2 = \frac{\frac{C_{CM}}{F_{CM}}}{\frac{C_M}{F_M}};$$

(b) comparing $L_1$ or $L_1^{-1}$ and $L_2$ or $L_2^{-1}$ to target values; and
  (c) adjusting at least one reactor parameter in response to deviations between $L_1$ or $L_1^{-1}$ and $L_2$ or $L_2^{-1}$ and the target values;
  wherein the olefin polymerization is catalyzed by a catalyst system, the catalyst system comprising a metallocene catalyst and a non-metallocene catalyst; and
  wherein the step of adjusting at least one reactor parameter is effective to alter the relative productivity of the catalysts.

23. The method of claim 22, wherein the monomer is ethylene and the comonomer is selected from the group consisting of $C_3$-$C_{12}$ alpha-olefins and mixtures thereof.

24. The method of claim 22, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

25. The method of claim 22, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

26. The method of claim 22, wherein the metallocene and non-metallocene catalysts are supported and are both present on the same support.

27. The method of claim 22, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

28. The method of claim 27, wherein the at least one reactor parameter comprises a water feed rate or a carbon dioxide feed rate.

29. A method of polymerizing olefin monomers and comonomers in a fluidized bed reactor, the method comprising:
  (a) determining feed rates $F_{H2}$, $F_M$, and $F_{CM}$ of hydrogen, the olefin monomer and the comonomer, respectively, provided to the reactor and gas phase concentrations $C_{H2}$, $C_M$, and $C_{CM}$ of the hydrogen, the olefin monomer and the comonomer, respectively, in a recycle gas stream of the reactor to obtain leading indicator functions $L_1$ and $L_2$ defined by:

$$L_1 = \frac{\frac{C_{H2}}{F_{H2}}}{\frac{C_M}{F_M}} \text{ and } L_2 = \frac{\frac{C_{CM}}{F_{CM}}}{\frac{C_M}{F_M}};$$

wherein step (a) is repeated a plurality of times to obtain L as a function of time, $L(t)$;
  (b) comparing $L_1(t)$ or $L_1^{-1}(t)$ and $L_2(t)$ or $L_2^{-1}(t)$ to target functions; and
  (c) adjusting at least one reactor parameter in response to deviations between $L_1(t)$ or $L_1^{-1}(t)$ and $L_2(t)$ or $L_2^{-1}(t)$ and the target functions;
  wherein the olefin polymerization is catalyzed by a catalyst system, the catalyst system comprising a metallocene catalyst and a non-metallocene catalyst; and
  wherein the step of adjusting at least one reactor parameter is effective to alter the relative productivity of the catalysts.

30. The method of claim 29, wherein the monomer is ethylene and the comonomer is selected from the group consisting of $C_3$-$C_{12}$ alpha-olefins and mixtures thereof.

31. The method of claim 29, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

32. The method of claim 29, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

33. The method of claim 29, wherein the metallocene and non-metallocene catalysts are supported and are both present on the same support.

34. The method of claim 29, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

35. The method of claim 34, wherein the at least one reactor parameter comprises a water feed rate or a carbon dioxide feed rate.

36. A method of olefin polymerization in a continuous reactor, the method comprising:
(a) determining feed rates $F_{H2}$ and $F_M$ of hydrogen and a selected monomer or comonomer, respectively, provided to the reactor and gas phase relative concentrations $C_{H2}$ and $C_M$ of the hydrogen and the selected monomer or comonomer, respectively, in a recycle gas stream of the reactor to obtain a leading indicator function L defined by:

$$L = \frac{C_{H2}/F_{H2}}{C_M/F_M};$$

(b) comparing L or $L^{-1}$ to a target value; and
(c) adjusting at least one reactor parameter in response to a deviation between L or $L^{-1}$ and the target value;
wherein the olefin polymerization is catalyzed by a catalyst system, the catalyst system comprising a metallocene catalyst and a non-metallocene catalyst; and
wherein the metallocene and non-metallocene catalysts are supported and are both present on the same support.

37. The method of claim 36, wherein the reactor is a fluidized bed reactor.

38. The method of claim 36, wherein the method produces copolymers having a majority of polymerized monomer units and a minority of polymerized comonomer units, and the selected monomer or comonomer is the monomer.

39. The method of claim 36, wherein the method produces copolymers having a majority of polymerized monomer units and a minority of polymerized comonomer units, and the selected monomer or comonomer is the comonomer.

40. The method of claim 39, wherein the monomer is ethylene and the comonomer is selected from the group consisting of $C_3$-$C_{12}$ alpha-olefins and mixtures thereof.

41. The method of claim 36, wherein the monomer is ethylene and the comonomer is selected from the group consisting of $C_3$-$C_{12}$ alpha-olefins and mixtures thereof.

42. The method of claim 36, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

43. The method of claim 36, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

44. The method of claim 36, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

45. The method of claim 36, wherein the at least one reactor parameter comprises a water feed rate or a carbon dioxide feed rate.

46. A method of olefin polymerization in a fluidized bed reactor, the method comprising:
(a) determining feed rates $F_{H2}$ and $F_M$ of hydrogen and a selected monomer or comonomer, respectively, provided to the reactor and gas phase relative concentrations $C_{H2}$ and $C_M$ of the hydrogen and the selected monomer or comonomer, respectively, in a recycle gas stream of the reactor to obtain a leading indicator function L defined by:

$$L = \frac{C_{H2}/F_{H2}}{C_M/F_M};$$

wherein step (a) is repeated a plurality of times to obtain L as a function of time, L(t);
(b) comparing L(t) or $L^{-1}$(t) to a target function; and
(c) adjusting at least one reactor parameter in response to a deviation between L(t) or $L^{-1}$(t) and the target function;
wherein the olefin polymerization is catalyzed by a catalyst system, the catalyst system comprising a metallocene catalyst and a non-metallocene catalyst; and
wherein the metallocene and non-metallocene catalysts are supported and are both present on the same support.

47. The method of claim 46, wherein the method produces copolymers having a majority of polymerized monomer units and a minority of polymerized comonomer units, and the selected monomer or comonomer is the monomer.

48. The method of claim 46, wherein the method produces copolymers having a majority of polymerized monomer units and a minority of polymerized comonomer units, and the selected monomer or comonomer is the comonomer.

49. The method of claim 48, wherein the monomer is ethylene and the comonomer is selected from the group consisting of $C_3$-$C_{12}$ alpha-olefins and mixtures thereof.

50. The method of claim 46, wherein the monomer is ethylene and the comonomer is selected from the group consisting of $C_3$-$C_{12}$ alpha-olefins and mixtures thereof.

51. The method of claim 46, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

52. The method of claim 46, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

53. The method of claim 45, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

54. The method of claim 46, wherein the at least one reactor parameter comprises a water feed rate or a carbon dioxide feed rate.

55. A method of polymerizing olefin monomers and comonomers in a fluidized bed reactor, the method comprising:
(a) determining feed rates $F_{H2}$, $F_M$, and $F_{CM}$ of hydrogen, the olefin monomer and the comonomer, respectively, provided to the reactor and gas phase concentrations $C_{H2}$, $C_M$, and $C_{CM}$ of the hydrogen, the olefin monomer and the comonomer, respectively, in a recycle gas stream of the reactor to obtain leading indicator functions $L_1$ and $L_2$ defined by:

$$L_1 = \frac{C_{H2}/F_{H2}}{C_M/F_M} \text{ and } L_2 = \frac{C_{CM}/F_{CM}}{C_M/F_M};$$

(b) comparing $L_1$ or $L_1^{-1}$ and $L_2$ or $L_2^{-1}$ to target values; and
(c) adjusting at least one reactor parameter in response to deviations between $L_1$ or $L_1^{-1}$ and $L_2$ or $L_2^{-1}$ and the target values;
wherein the olefin polymerization is catalyzed by a catalyst system, the catalyst system comprising a metallocene catalyst and a non-metallocene catalyst; and
wherein the metallocene and non-metallocene catalysts are supported and are both present on the same support.

56. The method of claim 55, wherein the monomer is ethylene and the comonomer is selected from the group consisting of $C_3$-$C_{12}$ alpha-olefins and mixtures thereof.

57. The method of claim 55, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

58. The method of claim 55, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

59. The method of claim 55, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

60. The method of claim 55, wherein the at least one reactor parameter comprises a water feed rate or a carbon dioxide feed rate.

61. A method of polymerizing olefin monomers and comonomers in a fluidized bed reactor, the method comprising:
(a) determining feed rates $F_{H2}$, $F_M$, and $F_{CM}$ of hydrogen, the olefin monomer and the comonomer, respectively, provided to the reactor and gas phase concentrations $C_{H2}$, $C_M$, and $C_{CM}$ of the hydrogen, the olefin monomer and the comonomer, respectively, in a recycle gas stream of the reactor to obtain leading indicator functions $L_1$ and $L_2$ defined by:

$$L_1 = \frac{C_{H2}/F_{H2}}{C_M/F_M} \text{ and } L_2 = \frac{C_{CM}/F_{CM}}{C_M/F_M};$$

wherein step (a) is repeated a plurality of times to obtain L as a function of time, L(t);
(b) comparing $L_1(t)$ or $L_1^{-1}(t)$ and $L_2(t)$ or $L_2^{-1}(t)$ to target functions; and
(c) adjusting at least one reactor parameter in response to deviations between $L_1(t)$ or $L_1^{-1}(t)$ and $L_2(t)$ or $L_2^{-1}(t)$ and the target functions;
wherein the olefin polymerization is catalyzed by a catalyst system, the catalyst system comprising a metallocene catalyst and a non-metallocene catalyst; and
wherein the metallocene and non-metallocene catalysts are supported and are both present on the same support.

62. The method of claim 61, wherein the monomer is ethylene and the comonomer is selected from the group consisting of $C_3$-$C_{12}$ alpha-olefins and mixtures thereof.

63. The method of claim 61, wherein the at least one reactor parameter is selected from the group consisting of a monomer feed rate, a comonomer feed rate, a catalyst feed rate, a cocatalyst feed rate, the hydrogen feed rate, a monomer concentration, a comonomer concentration, hydrogen concentration, carbon dioxide feed rate, water feed rate, and reactor temperature.

64. The method of claim 61, wherein the olefin polymerization is catalyzed by a catalyst system comprising a first catalyst producing a first polymer and a second catalyst producing a second polymer, and wherein the method produces a polymer product comprising the first polymer and the second polymer and having a distribution of molecular weight, composition, or both molecular weight and composition, that is broad or bimodal.

65. The method of claim 61, wherein the olefin polymerization is catalyzed by a supported bimetallic catalyst system comprising a metallocene catalyst and a non-metallocene transition metal catalyst, and wherein the method produces a polymer product having a distribution of molecular weight, composition, or both molecular weight and composition, that is broad or bimodal.

66. The method of claim 61, wherein the at least one reactor parameter comprises a water feed rate or a carbon dioxide feed rate.

* * * * *